(12) United States Patent
Pan

(10) Patent No.: US 11,151,069 B2
(45) Date of Patent: Oct. 19, 2021

(54) USB HUB AND OPERATING METHOD THEREOF

(71) Applicant: VIA LABS, INC., New Taipei (TW)

(72) Inventor: Li-Feng Pan, New Taipei (TW)

(73) Assignee: VIA LABS, INC., New Taipei (TW)

(*) Notice: Subject to any disclaimer, the term of this patent is extended or adjusted under 35 U.S.C. 154(b) by 0 days.

(21) Appl. No.: 16/879,791

(22) Filed: May 21, 2020

(65) Prior Publication Data

US 2020/0371980 A1 Nov. 26, 2020

Related U.S. Application Data

(60) Provisional application No. 62/851,642, filed on May 23, 2019.

(30) Foreign Application Priority Data

Mar. 27, 2020 (TW) .................. 109110613

(51) Int. Cl.
*G06F 13/38* (2006.01)
*G06F 13/40* (2006.01)

(52) U.S. Cl.
CPC ........ *G06F 13/382* (2013.01); *G06F 13/4022* (2013.01); *G06F 2213/0042* (2013.01)

(58) Field of Classification Search
CPC ......... G06F 13/4022; G06F 2213/0042; G06F 13/382; G06F 13/385; G06F 2213/3812; G06F 2213/4004

(Continued)

(56) References Cited

U.S. PATENT DOCUMENTS

2010/0146307 A1\* 6/2010 Griffin, Jr. .............. G06F 1/263
713/300
2011/0239008 A1\* 9/2011 Lam ...................... G06F 13/409
713/300

(Continued)

FOREIGN PATENT DOCUMENTS

CN 1780085 5/2006
CN 103078393 5/2013

(Continued)

OTHER PUBLICATIONS

"Office Action of China Counterpart Application", dated Jun. 8, 2021, p. 1-p. 7.

(Continued)

*Primary Examiner* — Faisal M Zaman
(74) *Attorney, Agent, or Firm* — JCIPRNET

(57) ABSTRACT

A USB hub and an operating method thereof are provided. The USB hub includes a first USB connector coupled to a first device, a second USB connector coupled to a second device, a first power switch, a second power switch, a power converter, and a third power switch. The first power switch has a first end coupled to a power pin of the first USB connector. The second power switch has a first end coupled to a second end of the first power switch, and a second end coupled to a power pin of the second USB connector. The power converter has an input coupled to the second end of the first power switch. The third power switch has a first end coupled to an output of the power converter, where a second end of the third power switch is coupled to the power pin of the second USB connector.

16 Claims, 5 Drawing Sheets

(58) Field of Classification Search
USPC .......................................................... 710/313
See application file for complete search history.

(56) References Cited

U.S. PATENT DOCUMENTS

| | | | | |
|---|---|---|---|---|
| 2012/0081087 | A1* | 4/2012 | Ching-Wei | G06F 1/266 323/282 |
| 2013/0132758 | A1* | 5/2013 | Shiba | G06F 1/266 713/340 |
| 2014/0035363 | A1* | 2/2014 | Fleisig | H01R 25/003 307/11 |
| 2015/0331826 | A1* | 11/2015 | Ghosh | G06F 13/4027 710/313 |
| 2016/0056626 | A1* | 2/2016 | Kawam | H02H 9/04 361/56 |
| 2017/0046289 | A1* | 2/2017 | Hundal | G06F 13/4282 |
| 2017/0123456 | A1* | 5/2017 | Chung | G06F 1/1632 |
| 2017/0185125 | A1* | 6/2017 | Lin | G06F 1/266 |
| 2017/0317583 | A1* | 11/2017 | Forghani-Zadeh | H03K 17/04206 |
| 2017/0364465 | A1* | 12/2017 | Tsukamoto | G06F 13/4022 |
| 2018/0074546 | A1* | 3/2018 | DeCamp | G09G 5/363 |
| 2018/0239732 | A1* | 8/2018 | Yang | G09G 5/006 |
| 2019/0196924 | A1* | 6/2019 | Gregg | G06F 13/4068 |
| 2019/0235593 | A1* | 8/2019 | Wang | G06F 1/266 |
| 2021/0109580 | A1* | 4/2021 | Tseng | H01H 47/00 |

FOREIGN PATENT DOCUMENTS

| | | |
|---|---|---|
| CN | 4563CH2013 | 9/2015 |
| CN | 104881387 | 9/2015 |
| CN | 205544514 | 8/2016 |
| CN | 206099469 | 4/2017 |
| CN | 107077444 | 8/2017 |
| CN | 108777627 | 11/2018 |
| CN | 108897704 | 11/2018 |
| CN | 109062846 | 12/2018 |
| CN | 109155533 | 1/2019 |
| TW | I583090 | 5/2017 |

OTHER PUBLICATIONS

"Office Action of Taiwan Counterpart Application", dated Aug. 11, 2021, p. 1-p. 7.

* cited by examiner

USB HUB AND OPERATING METHOD THEREOF

CROSS-REFERENCE TO RELATED APPLICATION

This application claims the priority benefits of U.S. provisional application Ser. No. 62/851,642, filed on May 23, 2019, and Taiwan application serial no. 109110613, filed on Mar. 27, 2020. The entirety of each of the above-mentioned patent applications is hereby incorporated by reference herein and made a part of this specification.

BACKGROUND

Technical Field

The disclosure relates to a hub, and in particular, to a universal serial bus (USB) hub.

Description of Related Art

Generally, a USB upstream-facing port (UFP) of a USB type-C (USB-C) hub or USB-C power delivery (PD) hub may be only coupled to a host device (such as a computer, mobile phone, or tablet computer) having a USB-C interface and may be used as a peripheral expansion port or an uplink for data transmission. One USB downstream-facing port (DFP) of the hub may be coupled to a power delivery (PD) USB connector of a power adapter. Other USB downstream-facing ports of the hub may be coupled to any other devices that need to perform data transmission with the host device.

When a USB connector (USB downstream-facing port) with a charge-through function of the hub is coupled to the power adapter, the hub may operate in a charge-through mode. When the host device performs data transmission with the other devices via the hub, the power adapter may charge the host device via the hub. However, in a case that the power adapter is coupled to the upstream-facing port of the hub, the power adapter cannot charge other devices coupled to the USB connector (USB downstream-facing port) with the charge-through function.

It should be noted that the contents in the prior art are used to help understand the invention. Some (or all) of the contents disclosed in the prior art may not be known techniques known to those with ordinary knowledge in the technical field. The contents disclosed in the prior art does not mean that the contents were known to those with ordinary knowledge in the technical field before an application of the invention.

SUMMARY

The invention provides a USB hub and an operating method thereof. An upstream-facing port of the USB hub may receive an output power of a power adapter.

The USB hub of the invention includes a first USB connector, a second USB connector, a first power switch, a second power switch, a first power converter, and a third power switch. The first USB connector, serving as an upstream-facing port, is configured to be coupled to a first device. The second USB connector, serving as a downstream-facing port, is configured to be coupled to a second device. The first power switch includes a first end coupled to a power pin of the first USB connector. The second power switch includes a first end coupled to a second end of the first power switch, where a second end of the second power switch is coupled to a power pin of the second USB connector. The first power converter includes an input coupled to the second end of the first power switch. The third power switch includes a first end coupled to an output of the first power converter, where a second end of the third power switch is coupled to the power pin of the second USB connector.

An operating method for the USB hub of the invention includes: when the USB hub operates in a first mode, turning on a first power switch and a second power switch, and turning off a third power switch, where a first end of the first power switch is coupled to a power pin of a first USB connector, a second end of the first power switch is coupled to a first end of the second power switch and an input of a first power converter, a first end of the third power switch is coupled to an output of the first power converter, and a second end of the second power switch and a second end of the third power switch are coupled to a power pin of a second USB connector, where the first USB connector, serving as an upstream-facing port, is coupled to a first device, and the second USB connector, serving as a downstream-facing port, is coupled to a second device; and when the USB hub operates in a second mode, turning on the first power switch and the third power switch, and turning off the second power switch.

Based on the foregoing, when the power adapter is coupled to the upstream-facing port (the first USB connector) of the USB hub according to the embodiment of the invention, the first power converter may use the output power of the power adapter and provide an output voltage to the power pin of the second USB connector (a USB connector with a charge-through function) through the third power switch. When the power adapter is coupled to a USB connector (the second USB connector) with the charge-through function, the USB hub may operate in the charge-through mode to transmit the output power of the power adapter to the upstream-facing port (the first USB connector).

To make the features and advantages of the invention clear and easy to understand, the following gives a detailed description of embodiments with reference to accompanying drawings.

DESCRIPTION OF THE EMBODIMENTS

Figure 1:
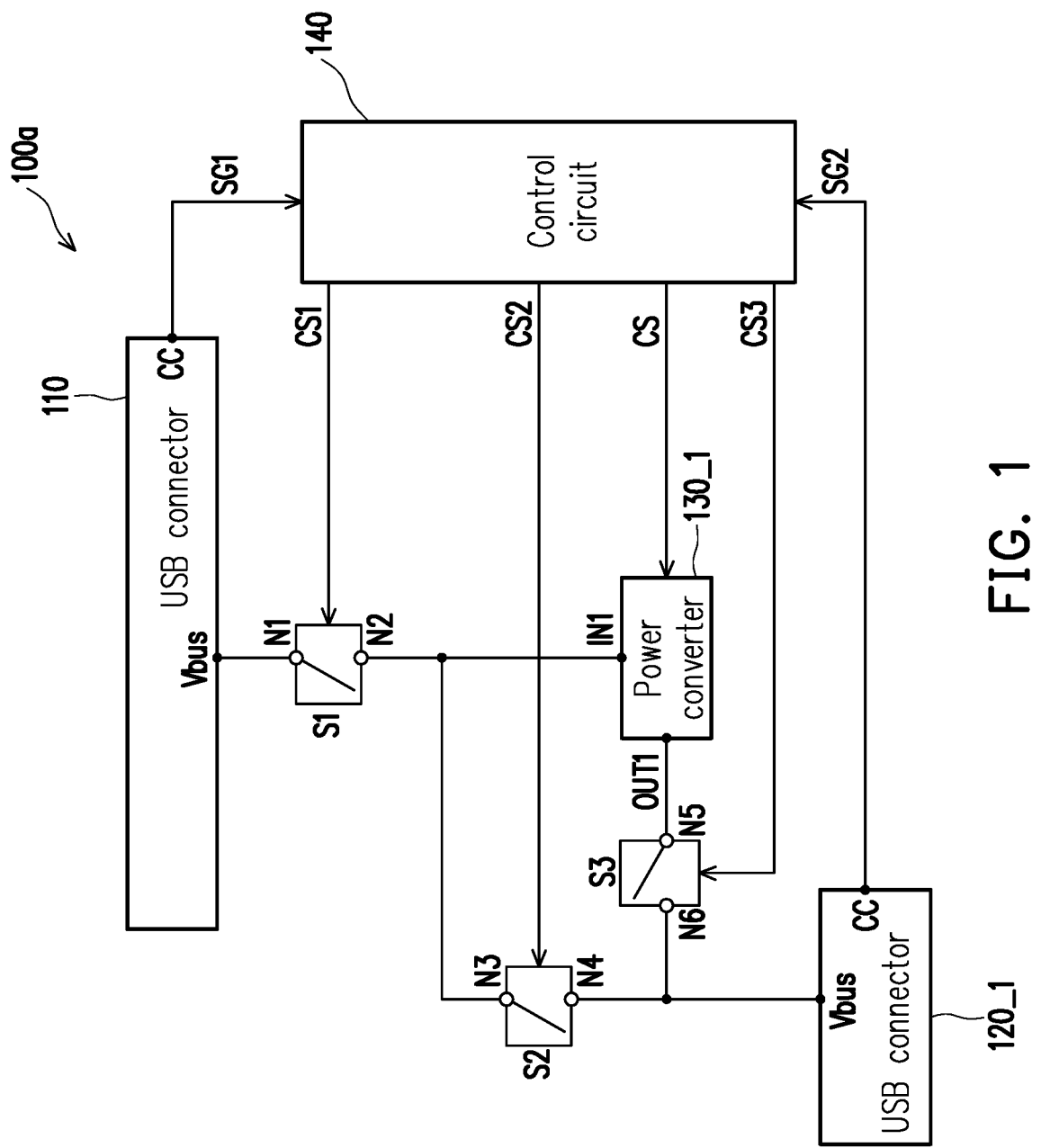
FIG. 1 is a schematic diagram of a circuit block of a USB hub according to an embodiment of the invention.

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

FIG. 1 is a schematic diagram of a circuit block of a USB hub 100a according to an embodiment of the invention. Referring to FIG. 1, the USB hub 100a includes a USB connector 110, a USB connector 120_1, a power converter 130_1, a power switch S1, a power switch S2, and a power switch S3. In the embodiment shown in FIG. 1, the USB connector 110 serves as an upstream-facing port (UFP) and is coupled to a first device (not shown). The USB connector 120_1 serves as a downstream-facing port (DFP) and is coupled to a second device (not shown). The first device and the second device are, for example, host devices or power adapters etc., but the invention is not limited thereto. In an embodiment, the USB connector 110 and the USB connector 120_1 are both USB-C ports, but the invention is not limited thereto. When a host device (such as a computer, a mobile phone, a tablet, or other electronic devices) is coupled to the USB connector 110, the USB hub 100a may serve as a hub configured to increase a number of USB connectors of the host device. When the power adapter is coupled to the USB connector 110, the USB hub 100a may serve as a hub configured to increase a number of USB connectors of the power adapter. Generally, the USB connector of the power adapter has a power supply function, but has no data transmission function.

In the present embodiment, an end N1 of a power switch S1 is coupled to a power pin Vbus (power bus pin) of the USB connector 110. An end N3 of a power switch S2 is coupled to an end N2 of the power switch S1, and an end N4 of the power switch S2 is coupled to the power pin Vbus of the USB connector 120_1. An input IN1 of the power converter 130_1 is coupled to the end N2 of the power switch S1. An end N5 of a power switch S3 is coupled to an output OUT1 of the power converter 130_1, and an end N6 of the power switch S3 is coupled to the power pin Vbus of the USB connector 120_1.

In an embodiment, the USB hub 100a further includes a control circuit 140. The control circuit 140 is configured to support a power delivery (PD) protocol. The control circuit 140 is coupled to a configuration channel pin CC of the USB connector 110 and a configuration channel pin CC of the USB connector 120_1. When an electronic device (not shown) is coupled to the USB connector 110, the control circuit 140 may learn configuration (configuration information SG1) of the electronic device via a configuration channel pin CC of the USB connector 110. When the electronic device (not shown) is coupled to the USB connector 120_1, the control circuit 140 may also learn configuration (configuration information SG2) of the electronic device via a configuration channel pin CC of the USB connector 120_1. According to the configuration (configuration information SG1) of the USB connector 110 and the configuration (configuration information SG2) of the USB connector 120_1, the control circuit 140 may output a control signal CS1, a control signal CS2, and a control signal CS3 to control the power switch S1, the power switch S2, and the power switch S3.

The control circuit 140 controls the power converter 130_1 by providing a control signal CS through a signal interface. In an embodiment, the signal interface may be an I2C interface, an SMBUS interface, or a signal interface of other specifications. The power converter 130_1 may be a step-down converter for converting a high-voltage input signal into different low-voltage output signals according to the control signal CS given by the control circuit 140. For example, when the control circuit 140 learns, via the configuration information SG1, a voltage level of the electronic device coupled to the USB connector 110, and also knows, via the configuration information SG2, a voltage level of the electronic device coupled to the USB connector 120_1, the control circuit 140 outputs a control signal CS to control the power converter 130_1 to perform a corresponding conversion, such as converting from 20 V to one of 5 V, 9 V, 12 V, or 15 V, or does not require a conversion.

According to different design requirements, an implementation of a block of the control circuit 140 may be in a form of hardware, firmware, software (program), or a combination of more than one of the foregoing three ones.

In terms of the hardware form, the block of the control circuit 140 may be implemented in a logic circuit on an integrated circuit. Related functions of the control circuit 140 may be implemented as the hardware by using hardware description languages (such as Verilog HDL or VHDL) or other suitable programming languages. For example, the related functions of the control circuit 140 may be implemented in one or more of a controller, a microcontroller, a microprocessor, an application-specific integrated circuit (ASIC), a digital signal processor (DSP), a field programmable gate array (FPGA), and/or various logic blocks, modules, and circuits in other processing units.

In terms of the software and/or firmware forms, the related functions of the control circuit 140 may be implemented as programming codes. For example, the control circuit 140 may be implemented by using a general programming language (such as C, C++, or a combined language) or other suitable programming languages. The programming codes may be recorded/stored in a recording medium. The recording medium includes, for example, a Read Only Memory (ROM), a storage device, and/or a Random Access Memory (RAM). A computer, a Central Processing Unit (CPU), a controller, a microcontroller, or a microprocessor may read and execute the programming code from the recording medium, to achieve related functions. As the recording medium, a "non-transitory computer readable medium" may be used, for example, a tape, a disk, a card, a semiconductor memory, or a programming logic circuit, etc. may be used. In addition, the program form may be provided to the computer (or CPU) via any transmission medium (a communication network or broadcast radio wave, etc.). The communication network is, for example, the Internet, wired communication, wireless communication, or other communication media.

Figure 2:
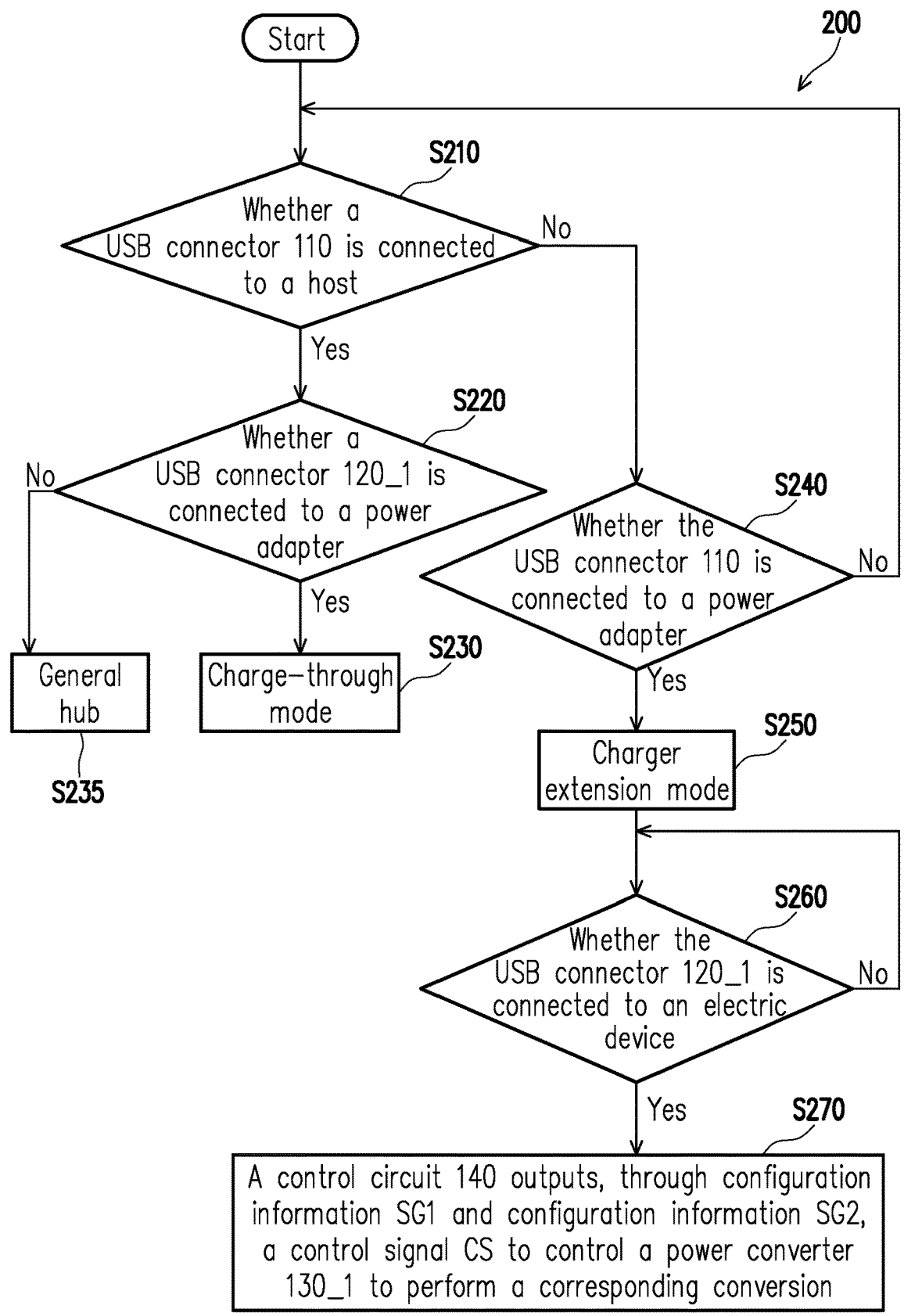
FIG. 2 is a flowchart of an operating method for a USB hub according to an embodiment of the invention.

FIG. 2 is a flowchart of an operating method 200 for a USB hub according to an embodiment of the invention. The operating method 200 shown in FIG. 2 is applicable to the USB hub 100a shown in FIG. 1. The operating method 200 shown in FIG. 2 is described in detail below with reference to various elements in the embodiment of FIG. 1. The related description of the operating method 200 shown in FIG. 2 may be analogously applied to a USB hub 100b shown in FIG. 3, a USB hub 100c shown in FIG. 4, and/or a USB hub 100d shown in FIG. 5.

Referring to FIG. 1 and FIG. 2, the control circuit 140 may determine whether the USB connector 110 is coupled to a host (not shown) in step S210. In particular, when an external device (not shown) is coupled to the USB connector 110, the control circuit 140 may receive, through a configuration channel pin CC of the USB connector 110, configuration information SG1 corresponding to an external device, and determine, according to the configuration information SG1, whether the external device coupled to the USB connector 110 is the host. In an embodiment, the host may be any device such as a desktop computer, a notebook computer, a personal digital assistant (PDA), a mobile phone, a digital camera, or a digital video camera. If the USB connector 110 is coupled to the host (a determination result in step S210 is "Yes"), step S220 may be performed for the control circuit 140.

In step S220, the control circuit 140 may determine whether the USB connector 120_1 is coupled to a power adapter (not shown). In particular, when an external device (not shown) is coupled to the USB connector 120_1, the control circuit 140 may receive, through the configuration channel pin CC of the USB connector 120_1, configuration information SG2 corresponding to the external device, and determine, according to the configuration information SG2, whether the external device coupled to the USB connector 120_1 is the power adapter. If the USB connector 120_1 is coupled to the power adapter (a determination result in step S220 is "Yes"), step S230 may be performed for the control circuit 140.

In step S230, the control circuit 140 may enter a charge-through mode (first mode). When the USB hub 100a operates in the charge-through mode, the control circuit 140 may turn on a power switch S1 and a power switch S2 through a control signal CS1 and a control signal CS2, and turn off a power switch S3 through a control signal CS3. Therefore, an output power of the power adapter (not shown) may be transmitted to the host (not shown) via the USB connector 120_1, the power switch S2, the power switch S1, and the USB connector 110.

If the USB connector 120_1 is not coupled to the power adapter (a determination result of step S220 is "No"), step S235 may be performed for the control circuit 140. In step S235, the control circuit 140 may enter a general hub mode. When the USB hub 100a operates in the general hub mode, the control circuit 140 turns on the power switch S1 and the power switch S3 through the control signal CS1 and the control signal CS3, and turns off the power switch S2 through the control signal CS2. The control circuit 140 outputs the control signal CS based on the configuration information SG1 and the configuration information SG2 to control the power converter 130_1 to perform a corresponding conversion, such as converting from 20 V to one of 5 V, 9 V, 12 V, or 15 V, or does not require a conversion. Therefore, the power converter 130_1 may use a power voltage from the USB connector 110, and the power converter 130_1 may transmit the output power to the USB connector 120_1 via the power switch S3.

If the USB connector 110 is not coupled to the host (a determination result in step S210 is "No"), step S240 may be performed for the control circuit 140. In step S240, the control circuit 140 may determine whether the USB connector 110 is coupled to the power adapter (not shown). In particular, when the external device (not shown) is coupled to the USB connector 110, the control circuit 140 may determine, according to the configuration information SG1, whether the external device coupled to the USB connector 110 is the power adapter. If the USB connector 110 is not coupled to the power adapter (a determination result in step S240 is "No"), return to step S210 for the control circuit 140.

If the USB connector 110 is coupled to the power adapter (a determination result in step S240 is "Yes"), proceed to step S250, and the control circuit 140 may enter a charger extension mode (second mode). When the USB hub 100a operates in the charger extension mode, the control circuit 140 may turn on the power switch S1 and the power switch S3 through the control signal CS1 and the control signal CS3, and turn off the power switch S2 through the control signal CS2. Therefore, an output power of the power adapter (not shown) may be transmitted to the power converter 130_1 via the USB connector 110 and the power switch S1. Therefore, the power converter 130_1 may use the power voltage from the USB connector 110, and the output power of the power converter 130_1 may be transmitted to the electric device (not shown) via the power switch S3 and the USB connector 120_1.

If the USB connector 110 is coupled to the power adapter (a determination result in step S240 is "Yes"), the control circuit 140 enters the charger extension mode (second mode). Step S260 may be performed for the control circuit 140. In step S260, the control circuit 140 may determine whether the USB connector 120_1 is coupled to an electric device (not shown). In particular, when an external device (not shown) is coupled to the USB connector 120_1, the control circuit 140 may determine, according to the configuration information SG2, whether the external device coupled to the USB connector 120_1 is an electric device. In an embodiment, the electric device may be any device such as a computer desk lamp, a computer fan, an MP3, a flash drive, a recording pen, a digital camera, or a mobile phone, etc. The control circuit 140 outputs the control signal CS based on the configuration information SG1 and the configuration information SG2 to control the power converter 130_1 to perform a corresponding conversion (step S270), such as converting from 20 V to one of 5 V, 9 V, 12 V, or 15 V, or does not require a conversion.

If the USB connector 120_1 is not coupled to the electric device (a determination result in step S260 is "No"), returning to step S260 for the control circuit 140.

Figure 3:
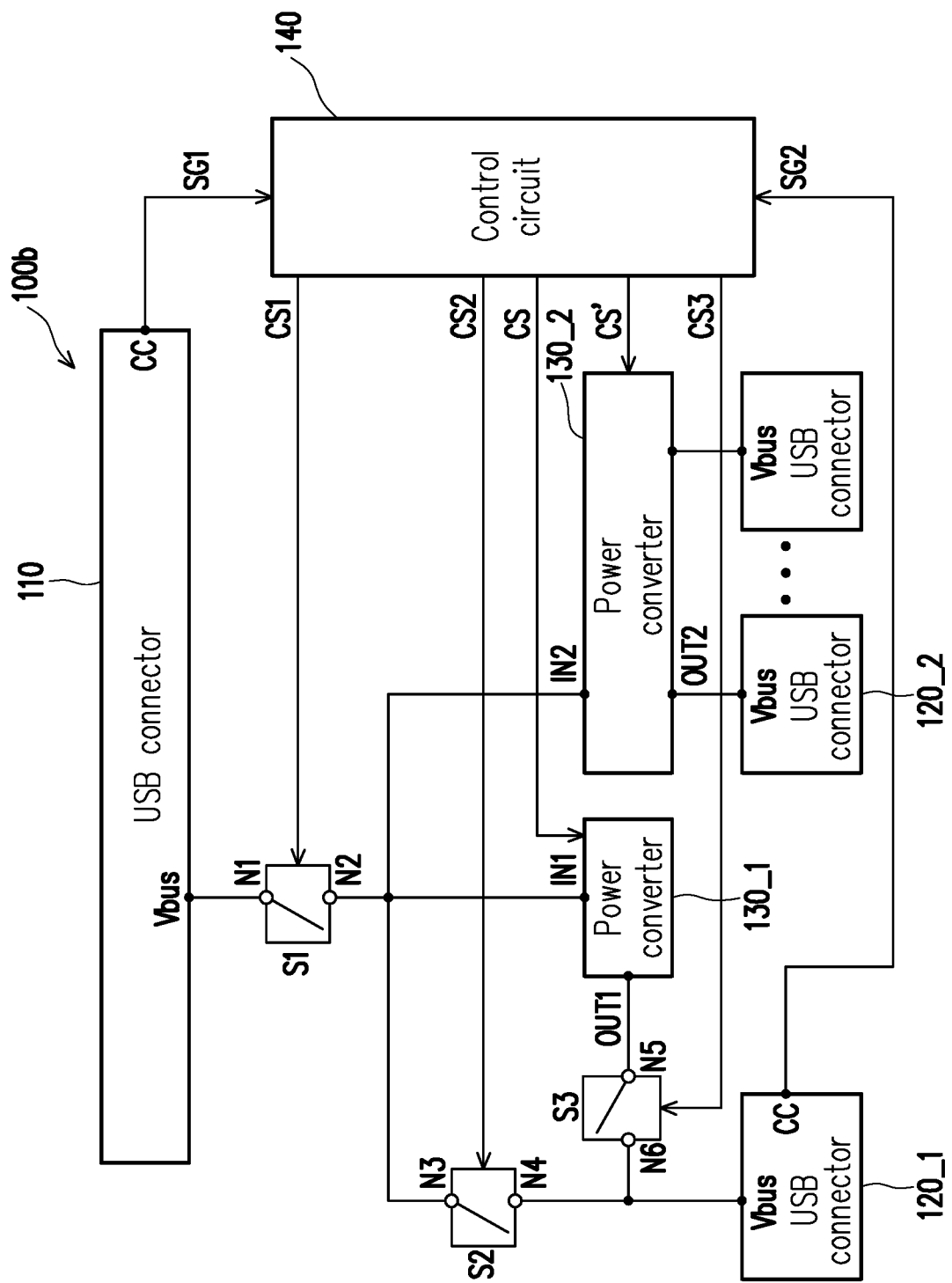
FIG. 3 is a schematic diagram of a circuit block of a USB hub according to another embodiment of the invention.

FIG. 3 is a schematic diagram of a circuit block of a USB hub 100b according to another embodiment of the invention. The USB hub 100b shown in FIG. 3 may be analogized with reference to the related description of the USB hub 100a shown in FIG. 1. The USB hub 100b of FIG. 3 is different from the USB hub 100a of FIG. 1 in that the USB hub 100b may further optionally include at least one USB connector 120_2 and a power converter 130_2. The USB connector 120_2 shown in FIG. 3 serves as a downstream-facing port and is coupled to a third device (not shown). The third device is, for example, an electric device, but the invention is not limited thereto. In an embodiment, the USB connector 110 and the USB connector 120_1 are both USB-C ports, and the at least one USB connector 120_2 is a USB type-A (USB-A) port, but the invention is not limited thereto.

In the embodiment of FIG. 3, an input IN2 of the power converter 130_2 is coupled to an end N2 of a power switch S1, and an output OUT2 of the power converter 130_2 is coupled to a power pin Vbus of the USB connector 120_2. The power converter 130_2 may be a step-down converter configured to convert a high-voltage input signal into different low-voltage output signals according to a control signal CS' given by a control circuit 140. The operating method 200 shown in FIG. 2 is also applicable to the USB hub 100b shown in FIG. 3. When the USB hub 100b operates in a charge-through mode, an output power of a power adapter connected to the USB connector 120_1 is preferentially allocated to a host connected to the USB connector 110, and a remaining output power is allocated to an electric device coupled to the USB connector 120_2. The control circuit 140 outputs the control signal CS' based on configuration information SG2 to control the power converter 130_2 to perform a corresponding conversion, for example, converting from 20 V to one of 5 V, 9 V, 12 V, 15 V. In an embodiment, when the control circuit 140 determines that the USB connector 110 is not coupled to a first device (a host or power adapter), and the USB connector 120_1 is coupled to the power adapter, the control circuit 140 turns off a power switch S1 and a power switch S3 through a control signal CS1 and a control signal CS3, and turns on the power switch S2 through the control signal CS2, and the power converter 130_1 is disabled. In this case, if the USB connector 120_2 is coupled to an electric device, the power adapter coupled to the USB connector 120_1 allocates an output power thereof to the electric device coupled to the USB connector 120_2.

In addition, in another embodiment, after the control circuit 140 determines that the USB connector 110 is coupled to the power adapter, the control circuit 140 further determines, according to a relationship between an output power of the power adapter and a threshold power, whether the USB hub 100b operates in a charger expansion mode. The threshold power may be determined according to design requirements. In particular, when the output power of the power adapter coupled to the USB connector 110 is greater than the threshold power (for example, 30 W), the control circuit 140 determines that the USB hub 100b operates in the charger expansion mode. In the charger extension mode, the USB hub 100b correspondingly controls a power supply circuit (such as the power converter 130_2) according to a relationship between a total power required by a coupled electric device and the output power of the power adapter, to dynamically adjust a charging power output to the coupled electric device. In other words, the control circuit 140 may correspondingly control the power converter 130_1 and the power converter 130_2 according to power requirements of the USB connector 120_1 and the USB connector 120_2, so as to dynamically adjust a power output to the USB connector 120_1 and the USB connector 120_2. In this way, the USB hub 100b may intelligently allocate the output power of the power adapter to an electric device coupled to the USB connector 120_1 and the USB connector 120_2.

Figure 4:
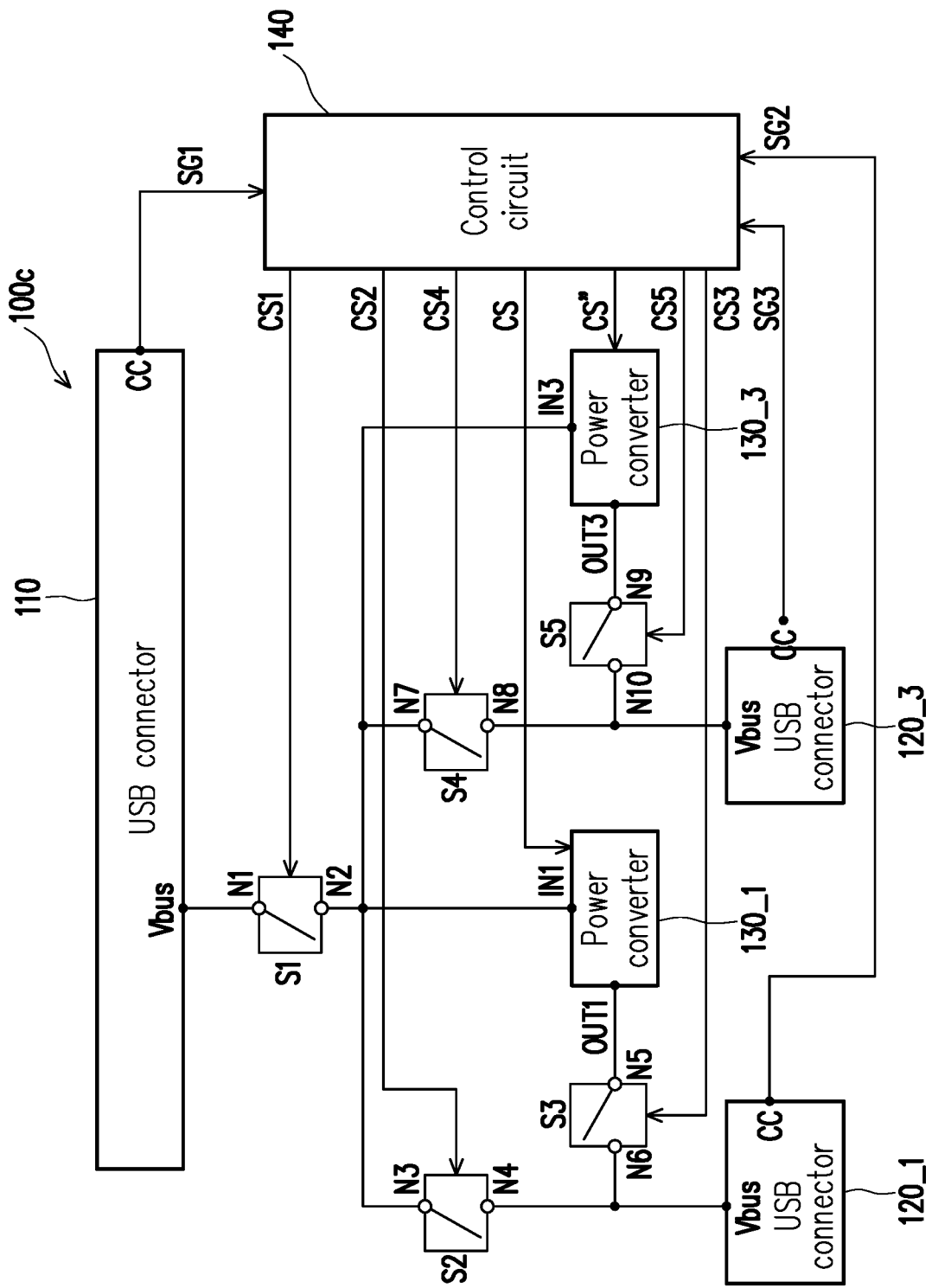
FIG. 4 is a schematic diagram of a circuit block of a USB hub according to still another embodiment of the invention.

FIG. 4 is a schematic diagram of a circuit block of a USB hub 100c according to still another embodiment of the invention. The USB hub 100c shown in FIG. 4 may be analogized with reference to the related description of the USB hub 100a shown in FIG. 1. The USB hub 100c of FIG. 4 is different from the USB hub 100a of FIG. 1 in that the USB hub 100c may further optionally include a USB connector 120_3, a power converter 130_3, a power switch S4, and a power switch S5. The USB connector 120_3 shown in FIG. 4 serves as a downstream-facing port and is coupled to a third device (not shown). The third device is, for example, an electric device, but the invention is not limited thereto. In an embodiment, the USB connector 110, the USB connector 120_1, and the USB connector 120_3 are USB-C ports.

In the embodiment shown in FIG. 4, an end N7 of the power switch S4 is coupled to an end N2 of a power switch S1, and an end N8 of the power switch S4 is coupled to a power pin Vbus of the USB connector 120_3. An input IN3 of the power converter 130_3 is coupled to the end N2 of the power switch S1. An end N9 of the power switch S5 is coupled to an output OUT3 of the power converter 130_3, and an end N10 of the power switch S5 is coupled to the power pin Vbus of the USB connector 120_3. The power converter 130_3 may be a step-down converter configured to convert a high-voltage input signal into different low-voltage output signals according to a control signal CS" given by a control circuit 140.

The control circuit 140 is further coupled to a configuration channel pin CC of the USB connector 120_3, and controls the power switch S1, the power switch S4, and the power switch S5 according to a configuration of the USB connector 110 and a configuration of the USB connector 120_3. In particular, when an external device (not shown) is coupled to the USB connector 120_3, the control circuit 140 may receive, through the configuration channel pin CC of the USB connector 120_3, a configuration signal SG3 corresponding to the external device, and output a control signal CS1, a control signal CS4, and a control signal CS5 to control the power switch S1, the power switch S4, and the power switch S5, respectively.

An operating method among the USB connector 110, the USB connector 120_3, the power switch S1, the power switch S4, and the power switch S5, is the same as an operating method among the USB connector 110, the USB connector 120_1, the power switch S1, the power switch S2, and the power switch S3. Therefore, the operating method 200 for the USB hub in the embodiment of FIG. 2 is also applicable to the USB hub 100c in the embodiment of FIG. 4.

Figure 5:
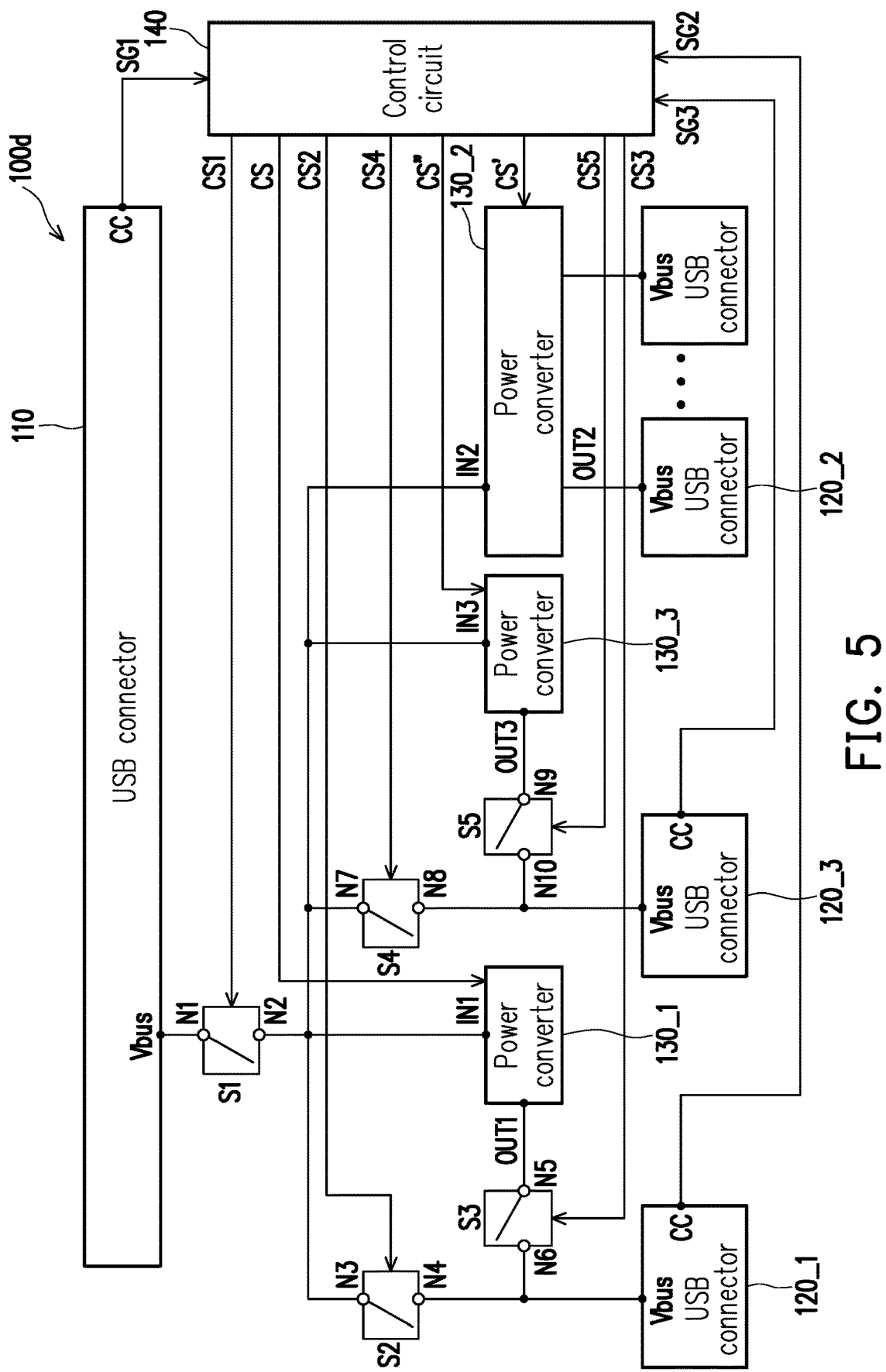
FIG. 5 is a schematic diagram of a circuit block of a USB hub according to yet another embodiment of the invention.

FIG. 5 is a schematic diagram of a circuit block of a USB hub 100d according to yet another embodiment of the invention. The USB hub 100d shown in FIG. 5 may be analogized with reference to the related description of the USB hub 100a shown in FIG. 1. The USB hub 100d of FIG. 5 is a combination of a structure of the USB hub 100b of FIG. 3 and a structure of the USB hub 100c of FIG. 4. In addition, an operating method for the USB hub 100d in the embodiment of FIG. 5 is the same as the operating method for the USB hub 100b in the embodiment of FIG. 3, the descriptions thereof are omitted herein.

It is worth mentioning that a downstream-facing port of the USB hub may be any combination of a type-A interface and a type-C interface. For example, the downstream-facing port of the USB hub in the foregoing embodiments may include one type-C connector and two type-A connectors, or one type-C connector and three type-A connectors, or two type-C connectors and one type-A connector, or two type-C connectors and two type-A connectors, or other combinations. It should be noted that the control circuit 140 may support a plurality of USB protocols according to design requirements, so as to comply with transmission requirements of the USB connector 110, the USB connector 120_1, the USB connector 120_2, and the USB connector 120_3 with different specifications. For example, when any one of the USB connector 110, the USB connector 120_1, the USB connector 120_2, and the USB connector 120_3 is a USB type-C port, the control circuit 140 may be a USB type-C port controller (TCPC) supporting a power delivery protocol, or a USB type-C port manager (TCPM). For another example, if the USB connector 110, the USB connector 120_1, the USB connector 120_2, and the USB connector 120_3 are USB type-A ports, the power converters 130_1, 130_2, and 130_3 may be a USB type-A port manager supporting a quick charge (QC) protocol. For still another example, when any of the USB connector 110, the USB connector 120_1, the USB connector 120_2, and the USB connector 120_3 is coupled to an external apparatus having a programmable power supply (PPS) function, the control circuit 140 may support a PPS protocol. The PPS protocol/function is a known protocol/function, and the descriptions thereof are omitted herein.

Based on the foregoing, in the embodiments of the invention, when the power adapter is coupled to the upstream-facing port (the USB connector 110) of the USB hub, the first power converter may use the output power of the power adapter and provide, through the power switch, an output voltage to the power pin of the USB connector 120_1 and/or 120_3 (a USB connector with a charge-through function). When the power adapter is coupled to the USB connector (the USB connector 120_1 and/or 120_3) with the charge-through function, the USB hub may operate in the charge-through mode to transmit the output power of the power adapter to the upstream-facing port (USB connector 110).

A dual-purpose USB hub applied in the invention may be used as a general USB hub. An upstream-facing port of the dual-purpose USB hub is coupled to a host, and a plurality of downstream-facing ports may be coupled to a plurality of devices to perform data transmission with the host and obtain power supply. In addition, the dual-purpose USB hub may be further used as a charger extension port. The upstream-facing port of the dual-purpose USB hub is coupled to a power adapter. The USB hub may supply the power provided by the power adapter to each downstream-facing port, so that each downstream-facing port may charge different electric devices separately. In this way, the user may only carry one dual-purpose USB hub, reducing a trouble of carrying too many devices.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A USB hub comprising:
a first USB connector, serving as an upstream-facing port, configured to be coupled to a first device;
a second USB connector, serving as a downstream-facing port, configured to be coupled to a second device;
a first power switch comprising a first end coupled to a power pin of the first USB connector;
a second power switch comprising a first end coupled to a second end of the first power switch, wherein a second end of the second power switch is coupled to a power pin of the second USB connector;
a first power converter comprising an input coupled to the second end of the first power switch;
a third power switch comprising a first end coupled to an output of the first power converter, wherein a second end of the third power switch is coupled to the power pin of the second USB connector; and
a control circuit configured to support a power delivery protocol, wherein the control circuit is coupled to a first configuration channel pin of the first USB connector and a second configuration channel pin of the second USB connector, and the control circuit controls the first power switch, the second power switch, and the third power switch according to first configuration information of the first device coupled to the first USB connector and second configuration information of the second device coupled to the second USB connector.

2. The USB hub according to claim 1, wherein
when the USB hub operates in a first mode, the first power switch and the second power switch are turned on, and the third power switch is turned off, and
when the USB hub operates in a second mode, the first power switch and the third power switch are turned on, and the second power switch is turned off.

3. The USB hub according to claim 2, wherein
when the first USB connector is coupled to a host and the second USB connector is coupled to a power adapter, the USB hub operates in the first mode, and
when the first USB connector is coupled to the power adapter, the USB hub operates in the second mode.

4. The USB hub according to claim 3, wherein
when the USB hub operates in the second mode, and an electric device is coupled to the second USB connector, the control circuit outputs, based on the first configuration information and the second configuration information, a control signal to control the first power converter to perform a corresponding power conversion.

5. The USB hub according to claim 2, further comprising:
a third USB connector, serving as a downstream-facing port, configured to be coupled to a third device; and
a second power converter comprising an input coupled to the second end of the first power switch, wherein an output of the second power converter is coupled to a power pin of the third USB connector.

6. The USB hub according to claim 5, wherein
when the first USB connector is not coupled to the first device, and the second USB connector is coupled to a power adapter, the first power switch and the third power switch are turned off, the second power switch is turned on, and the first power converter is disabled.

7. The USB hub according to claim 6, wherein
an output power of the power adapter coupled to the second USB connector is preferentially allocated to a host coupled to the first USB connector, and a remaining output power is allocated to an electric device coupled to the third USB connector.

8. The USB hub according to claim 6, wherein
the control circuit outputs, based on the second configuration information of the second USB connector, a control signal to control the second power converter to perform a corresponding conversion.

9. The USB hub according to claim 1, further comprising:
a third USB connector, serving as a downstream-facing port, configured to be coupled to a third device;
a fourth power switch comprising a first end coupled to the second end of the first power switch, wherein a second end of the fourth power switch is coupled to a power pin of the third USB connector;
a second power converter comprising an input coupled to the second end of the first power switch; and
a fifth power switch comprising a first end coupled to an output of the second power converter, wherein a second end of the fifth power switch is coupled to the power pin of the third USB connector.

10. The USB hub according to claim 9,
wherein the control circuit is coupled to the first configuration channel pin of the first USB connector and a third configuration channel pin of the third USB connector, and the control circuit controls the first power switch, the fourth power switch, and the fifth power switch according to first configuration information of the first device coupled to the first USB connector and third configuration information of the third device coupled to the third USB connector.

11. An operating method for a USB hub, comprising:
when the USB hub operates in a first mode, turning on a first power switch and a second power switch, and turning off a third power switch, wherein a first end of the first power switch is coupled to a power pin of a first USB connector, a second end of the first power switch is coupled to a first end of the second power switch and an input of a first power converter, a first end of the third power switch is coupled to an output of the first power converter, and a second end of the second power switch and a second end of the third power switch are coupled to a power pin of a second USB connector, wherein the first USB connector, serving as an upstream-facing port, is coupled to a first device, and the second USB connector, serving as a downstream-facing port, is coupled to a second device;

when the USB hub operates in a second mode, turning on the first power switch and the third power switch, and turning off the second power switch; and controlling, by a control circuit, the first power switch, the second power switch, and the third power switch according to first configuration information of the first device coupled to the first USB connector and second configuration information of the second device coupled to the second USB connector, wherein the control circuit is coupled to a first configuration channel pin of the first USB connector and a second configuration channel pin of the second USB connector.

12. The operating method according to claim 11, further comprising:

when the first USB connector is coupled to a host, and the second USB connector is coupled to a power adapter, operating, by the USB hub, in the first mode; and when the first USB connector is coupled to the power adapter, operating, by the USB hub, in the second mode.

13. The operating method according to claim 12, further comprising:

when the USB hub operates in the second mode, and an electric device is coupled to the second USB connector, outputting a control signal to control the first power converter to perform a corresponding power conversion.

14. The operating method according to claim 11, further comprising:

when the first USB connector is not coupled to the first device, and the second USB connector is coupled to a power adapter, turning off the first power switch and the third power switch, turning on the second power switch, and disabling the first power converter.

15. The operating method according to claim 14, further comprising:

preferentially allocating, to a host coupled to the first USB connector, an output power of the power adapter coupled to the second USB connector, and allocating a remaining output power to an electric device coupled to a third USB connector, wherein the third USB connector, serving as a downstream-facing port, is coupled to a third device.

16. The operating method according to claim 15, further comprising:

outputting a control signal to control a second power converter to perform a corresponding conversion, wherein an input of the second power converter is coupled to the second end of the first power switch, and an output of the second power converter is coupled to a power pin of the third USB connector.

* * * * *